United States Patent [19]

Vonk et al.

[11] 4,386,523

[45] Jun. 7, 1983

[54] APPARATUS FOR MEASURING AND/OR SAMPLING THE MILK-YIELD OF A COW DURING MILKING

[75] Inventors: Wim Vonk, Maassluis; Ryzard M. Bielawiec, Rijswijk; Hendrik J. van der Horn, Mantgum, all of Netherlands

[73] Assignee: N.V. Verengide Instrumentenfabrieken Enraf-Nonius, Netherlands

[21] Appl. No.: 296,219

[22] Filed: Aug. 25, 1981

[30] Foreign Application Priority Data

Sep. 9, 1980 [NL] Netherlands .......................... 8005082

[51] Int. Cl.³ .......................... G01F 15/08; G01F 5/00; G01N 1/20
[52] U.S. Cl. ........................................ 73/200; 73/202; 73/863.51
[58] Field of Search ...................... 73/202, 863.51, 200

[56] References Cited

U.S. PATENT DOCUMENTS

| | | | |
|---|---|---|---|
| 3,088,316 | 5/1963 | Hutchings | 73/202 |
| 3,272,010 | 9/1966 | Johnson | 73/863.51 |
| 3,349,617 | 10/1967 | Hartstone | 73/202 |
| 3,600,944 | 8/1971 | Hutchings | 73/863.51 |
| 3,942,388 | 3/1976 | Rathnow | 73/863.51 |

Primary Examiner—S. Clement Swisher
Attorney, Agent, or Firm—Kane, Dalsimer, Kane, Sullivan and Kurucz

[57] ABSTRACT

An apparatus for measuring and/or sampling the milk-yield of a cow during milking is described. The apparatus comprises a housing with a milk inlet and a milk outlet and a rotation-symmetric distributing means mounted in a drain chamber. A buffer chamber is formed in the housing above the drain chamber, in which buffer chamber the incoming milk stream is received. The buffer chamber is connected to the drain chamber by a cylindrical bore formed in its bottom wall, said bore being coaxial with the distributing means. Means are provided adapted to permit a milk flow to the distributing means through the cylindrical bore only when a predetermined milk quantity is received in the buffer chamber, said means interrupting said milk flow at a second smaller milk quantity in the buffer chamber. The distributing means provides a radial flowing milk film a portion of which is conducted to a measuring means through a receiving chamber. In this manner, it is quaranteed that under all circumstances a uniform milk flow is supplied to the distributing means, whereby a very high measuring accuracy is obtained.

26 Claims, 10 Drawing Figures

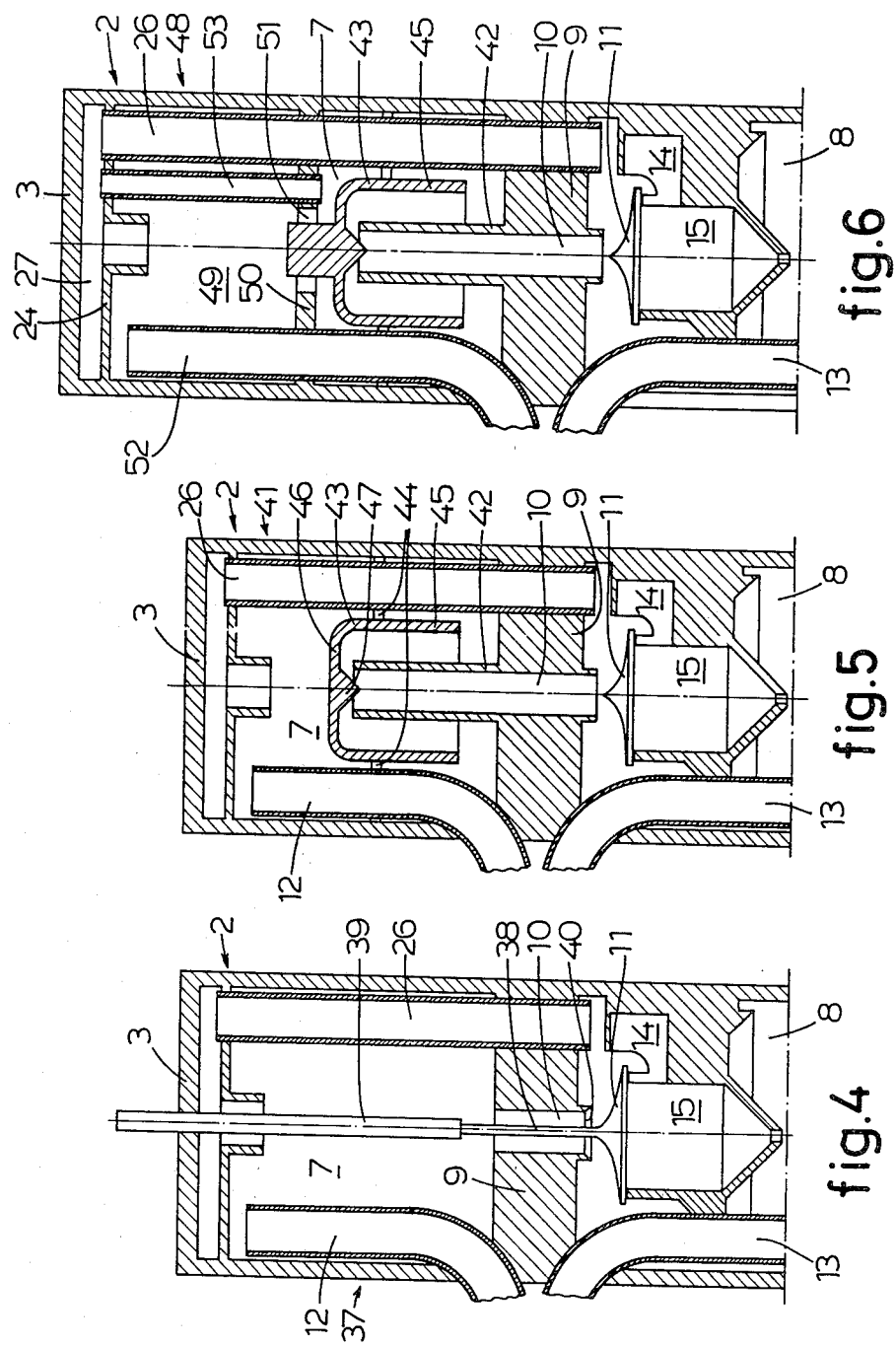

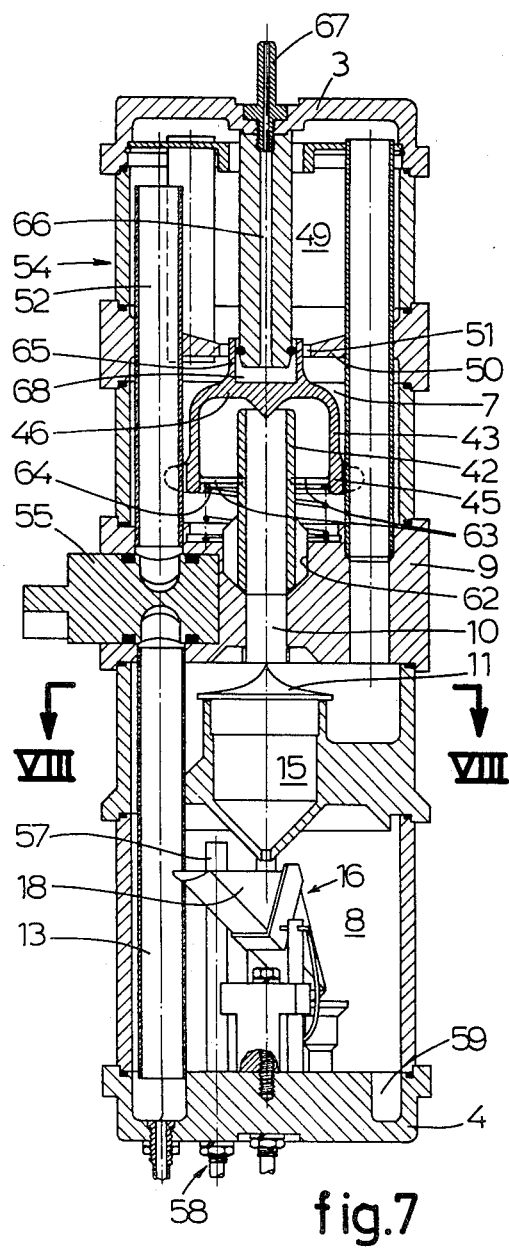
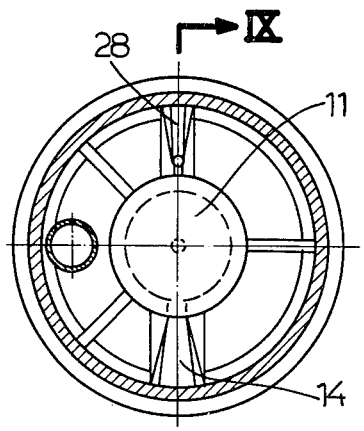
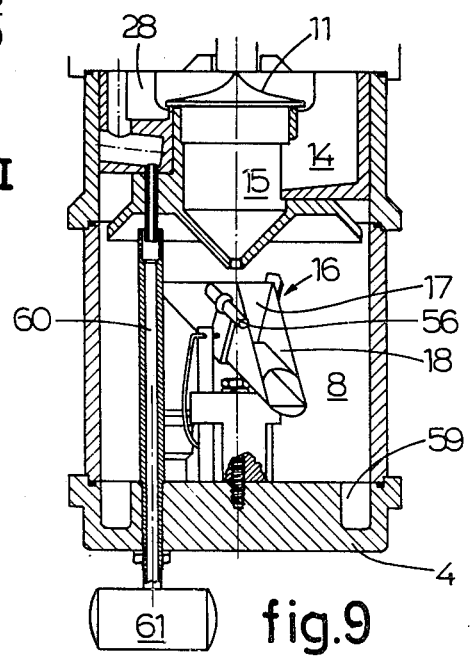
fig.7
fig.8
fig.9

ApparATUS FOR MEASURING AND/OR SAMPLING THE MILK-YIELD OF A COW DURING MILKING

BACKGROUND OF THE INVENTION

The invention relates to an apparatus for measuring and/or sampling the milk-yield of a cow during milking, comprising a housing with a milk inlet and a milk outlet, a rotation-symmetric distributing means mounted in a drain chamber within the housing, said drain chamber being connected with the milk outlet, wherein a milk flow is supplied in an axial direction to the distributing means to provide a radial flowing milk film, a portion of which is conducted to a measuring means through a receiving chamber.

Such an apparatus is known from U.S. Pat. No. 3,349,617. The measuring means of this known apparatus is formed as a measuring glass calibrated in weight units. It is assumed that the percentage of the total milk flow supplied to the measuring means remains constant during the milking of a cow. However, in the known apparatus a cylindrical conduit connected to the milk inlet is directed to the distributing means, so that the milk stream coming from the cow directly emerges onto the distributing means. This leads to the disadvantage that, during the milking of the cow, especially at a low milk flow, it is not guaranteed that a uniform milk flow is supplied to the distributing means, i.e. a milk stream filling the whole conduit or at least a milk stream being circumferentially present with a constant thickness along the whole conduit wall. Thereby, the portion of the milk flow supplied to the measuring means through the receiving chamber, does not continuously form a constant predetermined percentage of the total milk flow and in consequence thereof the accuracy of the measuring result obtained by the measuring means is not high.

SUMMARY OF THE INVENTION

It is an object of the invention to provide an apparatus of the above-mentioned type, wherein the above-mentioned disadvantage is obviated in an effective, but nevertheless simple manner.

To this end the apparatus according to the invention is characterized in that a buffer chamber is formed in the housing above the drain chamber, the incoming milk stream being received in said buffer chamber, which buffer chamber is connected to the drain chamber by a cylindrical bore formed in its bottom wall, said bore being coaxial with the distributing means, said apparatus including means adapted to permit a milk flow to the distributing means through the cylindrical bore only when a predetermined milk quantity is received in the buffer chamber, said means interrupting said milk flow at a second smaller milk quantity in the buffer chamber.

In this manner it is guaranteed that under all circumstances a uniform milk flow is supplied to the distributing means, whereby a very high measuring accuracy is obtained.

According to the invention said means may include a closing means for closing the cylindrical bore.

According to a simple embodiment of the invention the closing means may be pneumatically operable. Preferably, the closing means is connected to a diaphragm by a rod, said diaphragm closing a chamber alternately connectable to an underpressure or the atmospheric pressure by means of a valve. In this manner the closing means can be operated by means of the vacuum prevailing in the milk conduit system during milking.

In order to separate the froth from the incoming milk stream the apparatus according to the invention may comprise a froth separation chamber formed in the housing above the buffer chamber, a conduit connected to the milk inlet debouching in said froth separation chamber, which froth separation chamber is connected to the buffer chamber by a central opening formed in its bottom wall.

According to a preferred embodiment of the invention the buffer chamber is in communication with the drain chamber by a tube not accessible for the milk. In this manner it is obtained that the pressure in all spaces of the apparatus remains substantially constant, so that the underpressure in the milk conduit system is hardly influenced. Therefore, there is no danger of udder irritation or udder inflammation, so that the apparatus can permanently be included in the milk conduit system.

Preferably the measuring means is mounted in the drain chamber wherein the milk automatically flows into the drain chamber after measuring. Therefore, no special measures are necessary for leading back into the milk conduit system the portion of the milk flow, which is used for measuring.

According to the invention the milk inlet and the milk outlet are in connection with the respective chambers through a diverter valve. Thereby, the flow direction through the apparatus may be reversed during the cleaning of the milk conduit system in a conventional manner, whereby a more effective cleaning of the apparatus is obtained.

BRIEF DESCRIPTION OF THE DRAWINGS

The invention will hereinafter be further explained by reference to the drawings, in which some embodiments of the apparatus according to the invention are shown.

FIG. 4 is a schematical, partially shown axial section of a third embodiment of the apparatus according to the invention.

FIG. 5 is a schematical, partially shown axial section of a fourth embodiment of the apparatus according to the invention.

FIG. 6 is a partially shown axial section of an apparatus corresponding to the apparatus of FIG. 5 wherein a froth separation chamber is provided.

FIG. 7 is a more detailed section of the apparatus of FIG. 6.

FIG. 8 is a cross-section according to the line VIII—VIII of FIG. 7.

FIG. 9 is a partially shown axial section according to the line IX—IX of FIG. 8.

DESCRIPTION OF THE PREFERRED EMBODIMENTS

Figure 1:
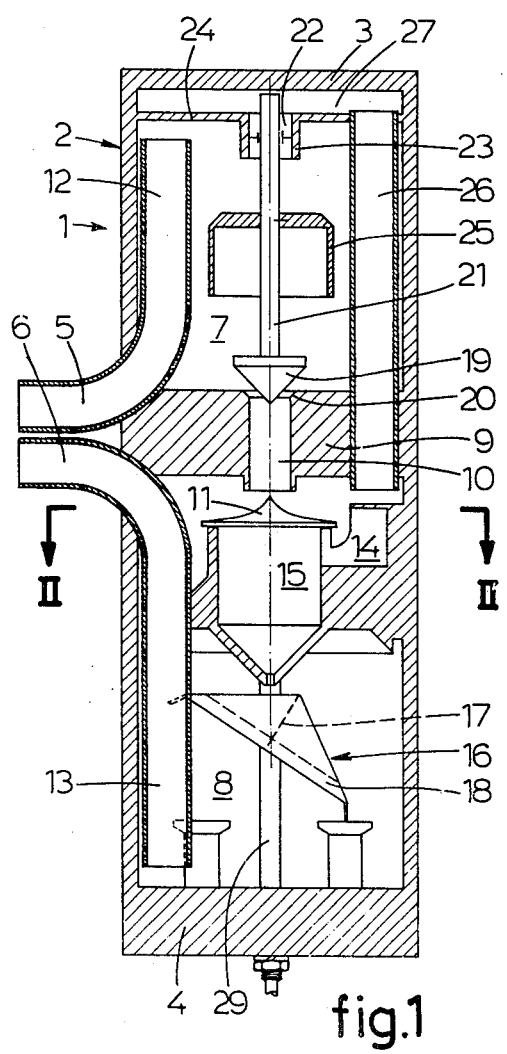
FIG. 1 is a schematically shown axial section of a first embodiment of the apparatus according to the invention.

In FIG. 1 an apparatus 1 is shown, with which the milk-yield can be measured during the milking of a cow. The apparatus 1 comprises a substantially cylindrical housing 2 with an upper wall 3 and a bottom wall 4. The housing 2 is preferably made from an impact resistant plastic material. The apparatus 1 can, for example, be connected in a milk conduit system mounted in a milking stall, by means of a milk inlet 5 and a milk outlet 6, so that the milk stream coming from a cow passes through the apparatus 1. As is known per se, an under-pressure is generated in such a milk conduit system, wherein the transport of the milk through said milk conduit system takes place by periodically letting in some air just after the udder of the cow.

A buffer chamber 7 and a drain chamber 8 are formed in the housing 2, the drain chamber 8 lying under the buffer chamber 7. The buffer chamber 7 is connected to the drain chamber 8 by a cylindrical bore 10 formed in its bottom wall 9, a rotation-symmetric distributing means 11 lying coaxially with the bore 10 in the drain chamber 8. In this manner the milk coming into the buffer chamber 7 through the milk inlet 5 and a conduit 12 connected thereto is supplied in an axial direction to the distributing means 11 through the cylindrical bore 10, whereby a radial flowing milk film is obtained.

The main portion of said milk directly arrives in the drain chamber 8 and is drained away through a conduit 13 joined to the milk outlet 6. However, a predetermined portion of the milk film is received in a receiving chamber 14, communicating to a funnel-shaped reservoir 15, which is closed at its upper side by the distributing means 11. The reservoir 15 debouches above a measuring means 16 known from Dutch Patent Application No. 73,05058.

The measuring means 16 includes a topple receptacle 18 divided in two parts by an intermediate wall 17, which receptacle 18 topples each time after the receipt of a fixed quantity of milk, for example 4 gram. Thereafter, the received milk flows into the drain chamber 8 and is drained away through the conduit 13 and the milk outlet 6. By counting the number of topple-actions occuring during the milking of a cow and by multiplying this number by both the weight corresponding to each topple-action and the dividing-factor of that portion of the total milk flow, which is received in the receiving chamber 14, the weight of the milk quantity produced by the cow can be determined.

With respect to the accuracy of the measuring result obtained in this manner it is of great importance that the percentage of the total milk flow received in the receiving chamber remains constant during the milking of the cow. To this end, a conical closing means 19 is provided according to the embodiment shown in FIG. 1, with which closing means the cylindrical bore 10 can be closed because the upper end of the bore 10 is formed as a mating valve seat 20. The closing means 19 is on its upper side provided with a rod 21, which is led in a central opening 22 having a collar 23 in a cross-wall 24 lying at a distance from the upper wall 3. A float 25 formed as a bell is directly connected to the rod 21. The closing means 19 closes the cylindrical bore 10 until the milk in the buffer chamber 7 has reached a predetermined level, at which the closing means 19 is moved upwardly by the float 25. The milk is then permitted to flow to the distributing means 11, so that the milk level in the buffer chamber 7 drops and the closing means 19 which is adapted to move downwardly with some delay, can close off again the cylindrical bore 10.

In this manner it is guaranteed that under all circumstances a uniform milk flow, i.e. a milk flow completely filling the cylindrical bore 10 or at least being circumferentially present with a constant thickness along the whole wall of the bore 10, is supplied to the distributing means 11. Thereby, the distribution of the milk flow is no longer dependent on the irregular milk stream coming from the cow, so that the percentage of the total milk flow received in the receiving chamber 14 remains constant during the milking of the cow.

A further important condition to be met by the apparatus 1 is that the underpressure prevailing at the milking unit placed on the udder of the cow is not influenced by the apparatus 1. A too great variation of said underpressure can cause, for example, udder irritation or udder inflammation. According to the embodiment shown in the drawings, the drain chamber 8 is connected to a space 27 by a tube 26, which space 27 is formed between the upper wall 3 and the cross-wall 24 and has an open connection to the buffer chamber 7 through the central opening 22. Thereby, the tube 26 is not accessible for the milk, so that under all circumstances an open connection is present between the drain chamber 8 and the buffer chamber 7 and, therefore, the underpressure is not influenced by the apparatus 1.

Figure 2:
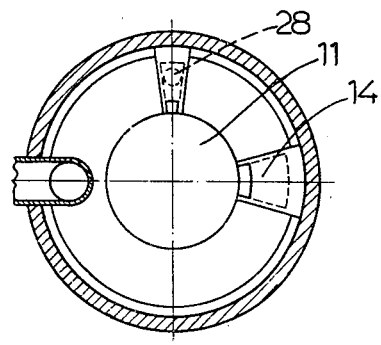
FIG. 2 is a cross-section according to the line II—II of FIG. 1.

Besides the milk-yield of the cow, it is further desired to determine the composition of the milk. To this end, a sample of the milk should be taken being representative for the whole milk-yield. For this purpose, the described apparatus 1 is provided with a second receiving chamber 28 (FIG. 2), in which a second smaller portion of the total milk flow is received. This milk portion is conducted through a conduit 29 to a not-shown reservoir lying outside the housing 2, from which reservoir a sample can be taken after the milking, whereafter the milk from the reservoir is led back to the milk conduit system.

Figure 3:
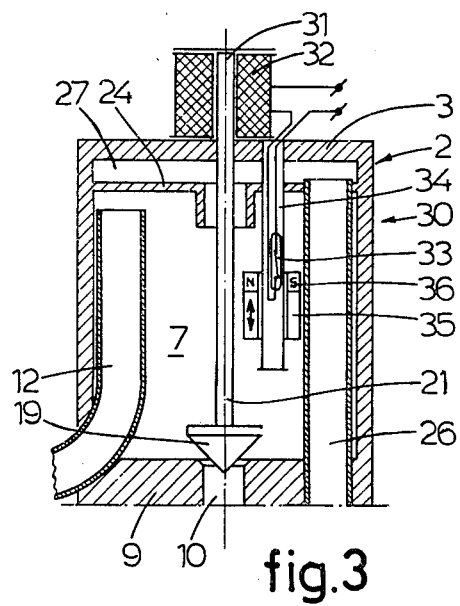
FIG. 3 is a schematical, partially shown axial section of a second embodiment of the apparatus according to the invention.

In FIG. 3 an apparatus 30 for measuring the milk-yield of a cow during milking is shown, which apparatus 30 for the most part is made in the same manner as the apparatus 1 of FIG. 1. The corresponding parts are indicated with the same reference numbers. At the apparatus 30 the rod 21 of the conical closing means 19 merges into a movable armature 31 of an electromagnet 32 connectable to a power supply not-shown, which electromagnet 32 is mounted on the upper wall 3 of the housing 2. A switching means 33 formed as a reed-switch is connected into one of the supply connections of the electromagnet 32, said switching means 33 being mounted in a tube 34 extending downwardly into the buffer chamber 7 and being closed off at the lower end. A float 35 surrounding the tube 34 with clearance is mounted in the buffer chamber 7 and supports a permanent magnet 36.

The cylindrical bore 10 in the bottom wall 9 debouching into the drain chamber not-shown in FIG. 3, is closed off by the closing means 19 at the absence of milk in the buffer chamber 7. Only when a predetermined milk level is reached, wherein the magnet 36 activates the switching means 33, so that the electromagnet is energized and the closing means 19 is pulled upwardly, a milk flow is permitted to flow to the distributing means not-shown in FIG. 3. When the milk level has dropped, the cylindrical bore 10 is closed off again by the closing means 19. In this manner it is guaranteed that even at an irregular milk stream coming from the cow a uniform milk flow is nevertheless supplied to the distributing means.

In FIG. 4 an embodiment of the apparatus according to the invention is shown, wherein the distributing means 11 is also used as closing means. For the remaining part the apparatus 37 of FIG. 4 corresponds to the apparatus 1 of FIG. 1, wherein the corresponding parts are indicated by the same reference numbers.

The distributing means 11 is provided with a central extension 38 merging into a rod 39 with greater diameter. The rod 29 is sealingly led through the upper wall of the housing 2. In this case, the distributing means 11 co-operates with the lower end of the cylindrical bore 10 formed as a mating valve seat 40. The distributing means 11 can be operated by means of a float connected to the rod 39 by a reverse mechanism not-shown, or by an electromagnet, as explained by reference to FIG. 3.

In FIG. 5 an embodiment of the apparatus according to the invention is shown, wherein no movable parts are used for passing and interrupting the milk flow to the distributing means 11. For the remaining part, the apparatus 41 of FIG. 5 is made in the same manner as the apparatus 1 of FIG. 1, wherein the corresponding parts are indicated by the same reference numbers.

At the apparatus 41 a tube 42 extending upwardly from the bottom wall 9 is provided in the buffer chamber 7, which tube coaxially joins the cylindrical bore 10. Further, a cylindrical cap 43 is mounted in the buffer chamber 7 coaxial with the tube 42 by means of a plurality of supports 44 connected to the inner wall of the buffer chamber 7. The cylinder wall 45 of the cap 43 surrounds with clearance the tube 42, wherein the lower edge of the cylinder wall 45 lies at a distance from the bottom wall 9. At the inner side of the upper wall 46 of the cap 43 a central conical projection 47 is formed, which projection extends into the tube 42.

Therefore, the milk flowing into the buffer chamber 7 through the conduit 12 cannot directly flow to the distributing means 11, and is collected in the buffer chamber 7. As soon as the milk level in the buffer chamber 7 has risen above the upper edge of the tube 42, the tube 42 and the cap 43 start to operate as a siphon, whereby a uniform milk flow is passed to the distributing means 11. This milk flow is maintained until the milk level has dropped below the lower edge of the cylinder wall 45 of the cap 43. The milk flow is then interrupted. At the apparatus 41 it is therefore also guaranteed that even at an irregular milk stream coming from the cow a uniform milk flow is nevertheless supplied to the distributing means 11, so that the percentage of the total milk flow supplied to the measuring means not-shown in FIG. 5 through the receiving chamber 14, remains constant during the milking of the cow.

Because the froth normally present in the milk flow could adversely affect the siphon operation of the tube 42 and the cap 43, a froth separation chamber 49 is formed in the housing 2 at the apparatus 48 shown in FIG. 6. The froth separation chamber 49 is connected to the buffer chamber 7 by a central opening 51 formed in its bottom wall 50.

In this case the milk inlet 5 is connected to the froth separation chamber 49 by a conduit 52, the milk being received in the froth separation chamber 49. Then, the milk flows to the buffer chamber 7 through the central opening 51 in the bottom wall 50, wherein the lighter froth stays behind for the most part in the froth separation chamber 49. For the rest the operation and the construction of the apparatus 48 fully correspond to those of the apparatus 41 of FIG. 5.

The space 27 between the upper wall 3 of the housing 2 and the cross wall 24 is connected to the drain chamber 8 by the tube 26, while further a connection with the buffer chamber 7 not accessible for the milk is formed by means of a tube 53. In this manner it is obtained that the same, substantially constant underpressure prevails in the whole apparatus 48, so that the underpressure at the milking unit is not influenced.

In FIGS. 7, 8 and 9 an apparatus 54 corresponding to the apparatus 48 according to FIG. 6 is shown in more detail. The corresponding parts are again indicated by the same reference numbers.

The milk inlet and the milk outlet, not visible in FIGS. 7, 8 and 9, are connected to the conduits 52 and 13, respectively, through a diverter valve 55. By changing the position of the diverter valve 55 the milk inlet can be connected to the conduit 13 and the milk outlet can be connected to the conduit 52, whereby the flow direction through the apparatus 54 is reversed. Thereby, a sufficient cleaning of the apparatus 54 is obtained during the cleaning of the milk conduit system, wherein hot water is propelled through the milk conduit system from the milk unit.

During operation, the milk flows into the froth separation chamber 49 through the milk inlet and the conduit 51, from which chamber 49 the milk flows through the central opening 52 in the bottom wall 50 into the buffer chamber 7. In order to guarantee a good emptying of the froth separation chamber 49, the bottom wall 50 extends somewhat obliquely towards the opening 51, as shown in FIG. 7. The milk is collected in the buffer chamber 7, until the milk level exceeds the upper edge of the tube 42, whereafter the above described siphon operation starts.

Through the tube 42 and the cylindrical bore 10 a milk flow, which is uniform under all circumstances, is then supplied to the distributing means 11, wherein a first portion of the radial flowing milk film is received in the receiving chamber 14 (see FIGS. 8 and 9) and a second portion is received in the receiving chamber 28, whereas the remaining portion flows directly into the drain chamber 8. The portion of the milk flow received in the receiving chamber 14 is supplied through the reservoir 15 to the topple receptacle 18, a permanent magnet 56 being fixed to said receptacle 18. The magnet 56 activates a reed-switch (not visible in the drawings) mounted in a tube 57 closed at its upper end. The connection wires of the reed switch are led through the lower wall 4 of the housing 2, as indicated at 58. In this manner an electrical signal is obtained, by which the milk-yield of the cow can be measured. It it noted that a magnet and a reed-switch for counting the number of topple actions are provided in the same manner at the embodiments shown in FIGS. 1–6.

At the apparatus 54, a collection groove 59 is formed in the bottom wall 4 of the drain chamber 8, in which groove the conduit 13 debouches.

As shown in FIG. 9, the receiving chamber 28 debouches in a tube 60 led through the bottom wall 4, which tube 60 extends to a reservoir 61 in which the corresponding portion of the milk flow is received. After the milking of the cow, a sample representative for the total milk-yield can be taken from the reservoir 61, which sample can be used to determine the composition of the milk. The remaining milk in this reservoir 61 can then be led back into the milk conduit system.

When the milk level in the buffer chambers 7 drops below the lower edge of the cylinder wall 45 of the cap 43, the siphon operation ends, so that the milk flow is interrupted. Thereby, a small quantity of milk will remain in the buffer chamber 7 after the milking of the cow. In order to supply also this milk which is of particular importance for measuring the fat content of the milk-yield, to the distributing means 11, the tube 42 is sealingly led into a widened part 62 of the cylindrical bore 10, whereby the tube 42 functions as a closing means for the bore 10.

In this case, the cap 43 is fixed to the tube 42 by means of a plurality of supports 63, wherein a spring 64 is provided between the cap 43 and the bottom wall 9 of the buffer chamber 7, which spring 64 exerts an upwardly directed force to the cap 43. A sleeve 65 is formed on the upper wall 46 of the cap 43, which sleeve 65 sealingly surrounds a tube 66 which is accessible through a nipple 67 led through the upper wall 3. A hose-pipe not-shown can be fixed onto the nipple 67, whereby the pressure in the space 68 lying within the tube 65 above the cap 43 can be varied.

During normal operation of the apparatus 54 the atmospheric pressure prevails in the space 68, while the usual underpressure ($\pm 0.5$ bar) prevailing in the milk conduit system is present within the apparatus 54. This pressure difference is greater than the spring force of the spring 64, so that the tube 42 is sealingly pressed in the widened part 62 of the cylindrical bore 10. At the termination of the milking of a cow, as detected by means of a conventional detector arranged in the milk conduit system for the purpose of removing the milking unit, said detector is also used to generate an underpressure in the space 68, whereby the spring 64 moves the cap 43 with the tube 42 upwardly. The remainder of the milk in the buffer chamber 7 can now drain away through the bore 10 and is distributed by the distributing means 11 in the described manner.

It is noted that such an arrangement for draining the remainder of the milk from the buffer chamber 7 can be provided in the apparatus according to FIG. 5 or FIG. 6.

It is further noted that during tests of the apparatus according to FIGS. 7-9 very good measuring results were obtained. At a rate of flow of 0.5-7 l/min an accuracy of better than 3% was reached. Moreover, it appeared that the milk was negligibly damaged by the apparatus.

Figure 10:
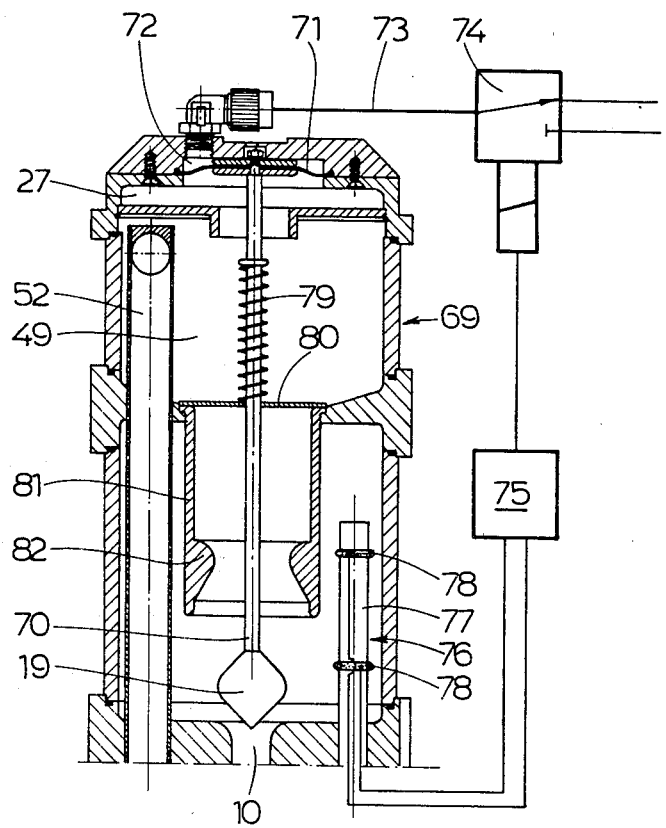
FIG. 10 is a partially shown axial section of a further embodiment of the apparatus according to the invention.

In FIG. 10 an apparatus 69 for measuring and/or sampling the milk-yield of a cow is shown, which corresponds for the main part to the apparatus 54 according to FIG. 7. Only the upper part shown is made in a different manner. At the apparatus 69 the unterpressure in the milk conduit system is used with advantage for operating the closing means 19. To this end the closing means 19 is connected to a diaphragm 71 by means of a rod 70, which diaphragm closes a chamber 72 lying above the space 27. The chamber 72 is connected through a conduit 73 to an electrically operable valve 74 which can alternately connect the chamber 72 to the atmospheric pressure and the underpressure in the milk conduit system, respectively.

The valve 74 is controlled by a control unit 75 in response to a signal of a level detector 76 mounted in the buffer chamber 7. The level detector 76 consists of a support 77 of non-conductive material, on which two electrodes 78 are mounted. The support 77 is shown schematically in FIG. 10. For the sake of clarity of the drawing the tube 26 which connects the space 27 with the drain chamber, is not shown in FIG. 10.

If there is no milk in the buffer chamber 7, the valve 74 is in the position, in which the chamber 72 is connected to the atmospheric pressure. As the underpressure of the milk conduit system prevails in the apparatus 69, the closing means 19 is sealingly pressed in the bore 10 against the action of a spring 79. The milk flowing into the buffer chamber 7 through the conduit 52 and the froth separation chamber 49 makes a resistance connection between the two electrodes 78 when the upper electrode 78 is reached, whereafter the control unit 75 switches the valve into the position, in which the chamber 72 is connected to the underpressure of the milk conduit system. Thereby, the closing means 19 is moved upwardly by the spring 79 which is connected to the rod 70 and is supported by a strip 80, so that the milk can flow to the distributing means not-shown in FIG. 10. The valve 74 is maintained in said last-mentioned position during a predetermined time (for instance 1 s) by the control unit 75, whereafter the valve 74 is switched to the first-mentioned position and the closing means 19 is again sealingly pressed in the bore 10.

At the apparatus 69 a sleeve 81 is mounted in the central opening 51 in the bottom wall 50, which sleeve 81 has an inwardly directed rounded projection 82 at its lower side. Said sleeve 81 provides a smooth flowing of the milk into the buffer chamber 7 to prevent frothing of the milk.

To further prevent frothing of the milk at the apparatus 69 the closing means 19 has a conical shape at its upper side. Further the conduit 52 has a partly annular extending part at its upper end, whereby the milk smoothly flows into the froth separation chamber 49.

The invention is not restricted to the embodiments described, which can be varied in a number of ways within the scope of the invention.

I claim:

1. Apparatus for measuring and/or sampling the milk-yield of a cow during milking, comprising a housing with a milk inlet and a milk outlet, a rotation-symmetric distributing means mounted in a drain chamber within the housing, said drain chamber being connected with the milk outlet, wherein a milk flow is supplied in an axial direction to the distributing means to provide a radial flowing milk film, a portion of which is conducted to a measuring means through a receiving chamber, wherein a buffer chamber is formed in the housing above the drain chamber, the incoming milk stream being received in said buffer chamber, which buffer chamber is connected to the drain chamber by a cylindrical bore formed in its bottom wall, said bore being coaxial with the distributing means, said apparatus including means adapted to permit a milk flow to the distributing means through the cylindrical bore only when a predetermined milk quantity is received in the buffer chamber, said means interrupting said milk flow at a second smaller milk quantity in the buffer chamber.

2. Apparatus according to claim 1, wherein said means include a closing means for closing the cylindrical bore.

3. Apparatus according to claim 2, wherein the closing means is pneumatically operable.

4. Apparatus according to claim 3, wherein the closing means is connected to a diaphragm by a rod, said diaphragm closing a chamber alternately connectable to an underpressure or the atmospheric pressure by means of a valve.

5. Apparatus according to claim 4, wherein the closing means is spring-biased in its open position when the pressure in said chamber is substantially equal to the pressure in the apparatus.

6. Apparatus according to claim 5, wherein a level detector is mounted in the buffer chamber, which level detector is connected to a control unit for controlling the diverter valve.

7. Apparatus according to claim 2 or 4, wherein the closing means is operable by a float mounted in the buffer chamber.

8. Apparatus according to claim 7, wherein a switching means is provided, said switching means being operable by said float to activate an electrical control means for operating the closing means.

9. Apparatus according to claim 8, wherein the switching means is a reed-switch, and in that the float supports a permanent magnet.

10. Apparatus according to claim 8, wherein the control means operates said valve.

11. Apparatus according to claim 8, wherein the control means includes an electromagnet with a movable armature connected to the closing means.

12. Apparatus according to claim 7, wherein the float is directly connected to the closing means.

13. Apparatus according to claim 4, 11 or 12, wherein the closing means cooperates with the upper end of the cylindrical bore, said upper end being formed as a mating valve seat.

14. Apparatus according to claim 2, wherein the closing means consists of the movably mounted distributing means cooperating with the lower end of the cylindrical bore, which lower end is formed as a mating valve seat, wherein the distributing means is provided with an operating rod extending upwardly in the buffer chamber through the cylindrical bore.

15. Apparatus according to claim 1 or 4, wherein a froth separation chamber is formed in the housing above the buffer chamber, a conduit connected to the milk inlet debouching in said froth separation chamber, which froth separation chamber is connected to the buffer chamber by a central opening formed in its bottom wall.

16. Apparatus according to claim 15, wherein a sleeve is mounted in the central opening of the bottom wall of the froth separation chamber, which sleeve extends into the buffer chamber and is provided with an inwardly directed rounded projection at its lower side.

17. Apparatus according to claim 1 wherein said means include a tube coaxially jointed to the cylindrical bore and extending upwardly from the bottom wall of the buffer chamber, and furthermore a cylindrical cap coaxial with the tube and surrounding said tube with clearance, wherein the cylindrical wall of said cap ends at a distance above the bottom wall of the buffer chamber.

18. Apparatus according to claim 17, wherein the cap is connected to the tube, wherein the tube with its lower end sealingly extends into a widened part of the cylindrical bore, while the cap has an upright sleeve on its upper wall, said upright sleeve being sealingly connected to a tube extending outwardly of the housing, wherein a spring is provided exerting an upwardly directed force to the cap, and wherein, during milking, the pressure above the part of the cap within the upright sleeve is higher than the pressure within the housing, so that the tube is sealingly pressed in the widened part of the cylindrical bore against the spring action.

19. Apparatus according to claim 18, wherein the upper wall of the cap has a central conical projection at its inner side, said projection extending into the tube.

20. Apparatus according to claim 17, wherein a froth separation chamber is formed in the housing above the buffer chamber, a conduit connected to the milk inlet debouching in said froth separation chamber, which froth separation chamber is connected to the buffer chamber by a central opening formed in its bottom wall.

21. Apparatus according to claim 1, wherein the buffer chamber is in communication with the drain chamber by a tube not accessible for the milk.

22. Apparatus according to claim 20, wherein the froth separation chamber is connected to the drain chamber by a tube not accessible for the milk, while the buffer chamber is connected to the froth separation chamber by a further tube not accessible for the milk.

23. Apparatus according to claim 1, wherein a second portion of the radial flowing milk film is conducted through a second receiving chamber to a reservoir outside the housing, wherein a milk sample can be taken from the reservoir to determine the milk quality.

24. Apparatus according to claim 1, wherein the measuring means is mounted in the drain chamber and wherein the milk automatically flows into the drain chamber after measuring.

25. Apparatus according to claim 1, wherein an annular collection groove is formed in the bottom wall of the drain chamber, a conduit connected to the milk outlet debouching into said collection groove.

26. Apparatus according to claim 1, wherein the milk inlet and the milk outlet are in communication with the respective chambers through a diverter valve.

* * * * *

UNITED STATES PATENT AND TRADEMARK OFFICE
CERTIFICATE OF CORRECTION

PATENT NO. : 4,386,523

DATED : June 7, 1983

INVENTOR(S) : Wim Vonk, Ryzard M. Bielawiec, Hendrik J. van der Horn

It is certified that error appears in the above—identified patent and that said Letters Patent is hereby corrected as shown below:

The name of the assignee should read

--N.V. VERENIGDE INSTRUMENTENFABRIEKEN ENRAF-NONIUS--

Signed and Sealed this

Twenty-fifth Day of October 1983

[SEAL]

Attest:

GERALD J. MOSSINGHOFF

Attesting Officer

Commissioner of Patents and Trademarks